United States Patent [19]

Geeren et al.

[11] 4,067,881

[45] Jan. 10, 1978

[54] MANUFACTURE OF POLYCHLORO-COPPER PHTHALOCYANINES

[75] Inventors: Hermann Geeren, Ruchheim; Wolfgang Fabian, Wilhelmsfeld, both of Germany

[73] Assignee: BASF Aktiengesellschaft, Ludwigshafen, Germany

[21] Appl. No.: 704,563

[22] Filed: July 12, 1976

[51] Int. Cl.$^2$ .................................................. C09B 47/10
[52] U.S. Cl. ................................................... 260/314.5
[58] Field of Search ....................................... 260/314.5

[56] References Cited

U.S. PATENT DOCUMENTS 2,247,752  7/1941  Fox .................................... 260/314.5

FOREIGN PATENT DOCUMENTS 1,059,595  6/1959  Germany ........................... 260/314.5

OTHER PUBLICATIONS

Moser et al., Phthalocyanine Compounds, pp. 174 to 175, Reinhold Publishing Corp. (1963).

*Primary Examiner*—Richard L. Raymond
*Attorney, Agent, or Firm*—Keil, Thompson & Shurtleff

[57] ABSTRACT

In a process for the manufacture of polychloro-copper phthalocyanines by chlorinating copper phthalocyanines in aluminum chloride/sodium chloride melts at from 110° to 190° C, the improvement wherein from 0.20 to 0.33 part by weight of copper phthalocyanine, per part by weight of melt, is rapidly introduced into the melt at temperatures from the solidification point of the melt to 120° C, and after this material has been introduced, the chlorination, to give polychloro-copper phthalocyanine, is carried out at from 140° to 160° C by rapidly passing chlorine into the mixture. A polychloro-copper phthalocyanine which contains less than 0.05 per cent by weight of aluminum and which can be converted, by any conventional finishing process, into yellowish green pigment forms, is obtained with high space-time yield.

10 Claims, No Drawings

MANUFACTURE OF POLYCHLORO-COPPER PHTHALOCYANINES

The present invention relates to a process for the manufacture of polychloro-copper phthalocyanines which are virtually free from polychloro-aluminum phthalocyanines.

On an industrial scale, polychloro-copper phthalocyanines (polychloro-CuPc) are manufactured by chlorinating copper phthalocyanine (CuPc) in melts of aluminum chloride and sodium chloride at elevated temperatures (U.S. Pat. No. 2,247,752; BIOS Final Report No. 960, pages 49/51). According to the BIOS report (loc. cit.), the copper phthalocyanine is introduced slowly (at from 100 to 140 kg/hr) into the melt at 155° C, so as not to exceed a temperature of 165° C. Chlorine is the passed into this mixture at from 160° to 190° C until the desired degree of chlorination is reached. It is specially noted in the reference that the chlorination must initially be carried out slowly, since otherwise too much chlorine is lost with the hydrogen chloride produced in the reaction. 0.19 part by weight of copper phthalocyanine is used per part by weight of melt.

The process suffers from a number of disadvantages. Thus, different CuPc materials give products with greatly differing tinctorial properties. Such chlorination products are very difficult to convert to useful pigmentary forms. Further disadvantages are that the space-time yield is low and the process is labor-intensive. Furthermore, because of the high reaction temperature, the aluminum chloride sublimes from the melt, causing a rise in the solidification point and the viscosity of the melt.

However, the greatest disadvantage of this chlorination process is that a replacement of the copper in the CuPc by aluminum occurs in the melt, i.e. the polychloro-CuPc product obtained contains polychloro-aluminum phthalocyanine. Since such mixtures give distinctly duller color shades and have poorer fastness to light and to weathering than has pure polychloro-CuPc, this replacement reaction has an adverse effect on the tinctorial and technological properties of the product. This is undoubtedly the reason why, according to the description in the BIOS report (loc. cit.) the melt is to be cooled to 155° C before introducing the CuPc, and the latter is to be introduced cautiously because of the heat of solution which is liberated. However, even when observing these measures, a distinct replacement of copper by aluminum occurs, especially at the start of the introduction of the CuPc, as can easily be demonstrated analytically.

German Pat. 1,125,574 discloses a process for chlorinating phthalocyanines in melts of iron chloride and/or aluminum chloride and, if appropriate, constituents which lower the melting point, in which the melt is treated, above 120° C but not significantly above 200° C, with oxygen, oxygen-containing gases or compounds which do not have a chlorinating action and eliminate oxygen at the said temperatures.

In addition to the low space-time yield and the large amount of melt required (the ratio of melt to CuPc is, by weight, 1:0.05), the process has the disadvantage that highly chlorinated compounds can only be manufactured with great difficulty, if at all.

German Pat. Nos. 1,059,595, 1,254,787 and 1,250,032 disclose processes in which CuPc is chlorinated in aluminum chloride/sodium chloride melts at from 120° to 160° C. The halogenating agents required in these processes are halosulfonic acids, e.g. chlorosulfonic acids, sulfur chlorides together with pyrosulfuryl chloride, or disulfur dichloride together with sulfuryl chloride.

U.S. Pat. No. 2,873,279 discloses a process for chlorinating CuPc, in which a liquid mixture of sulfur dioxide and aluminum chloride is used as the reaction medium. The chlorination is carried out by simultaneous introduction of chloride and sulfur dioxide at from 75° to 180° C.

These processes are uneconomical because of the expensive halogenating agents and/or because of the low space-time yield. Because of the large amount of noxious gaseous constituents formed from the halogenating agents during the chlorination, these processes also present major ecological problems.

It is an object of the present invention to provide a process which can readily be carried out industrially and by means of which the chlorination of CuPc, in the conventional aluminum chloride/sodium chloride melt, can be carried out with elementary chlorine, and during which very little, if any, replacement of the copper in the CuPc by aluminum takes place.

We have found that this object is achieved and that polychloro-CuPc which is practically free from aluminum phthalocyanines is obtained by chlorinating CuPc in aluminum chloride/sodium chloride melts at from 110° to 190° C if from 0.25 to 0.32 part by weight of copper phthalocyanine, per part by weight of melt, is rapidly introduced into the aluminum chloride/sodium chloride melt at from the solidification point to 120° C, and after the introduction of the copper phthalocyanine into the melt the chlorination, to give polychloro-copper phthalocyanine, is carried out at from 120° to 160° C, by introduction of from 7 to 12% of the total amount of chlorine gas required.

By using the process of the invention, CuPc which has been manufactured by a great variety of conventional processes is converted to a high quality polychloro-CuPc which contains an average of less than 0.05 percent by weight of aluminum phthalocyanine. Thus, e.g. CuPc manufactured by the baking process, which is about 90 percent pure, can be converted to a high quality yellowish green polychloro-CuPc. The products can be converted to tinctorially valuable pigments by any conventional finishing processes.

The polychloro-CuPc products of the invention are polychloro compounds of CuPc which contain from 8 to 16, and preferably from 13 to 16, chlorine atoms, in the molecule.

The process according to the invention is in general carried out by producing a melt of aluminum chloride and sodium chloride by heating the mixture of the components at about 160° C. The melt is then cooled to a temperature from the solidification point, which is from about 85° to 105° C, to 120° C, preferably to temperatures of from 90° to 110° C. The CuPc is then introduced very rapidly into this melt, whilst continuing to apply cooling. Advantageously, the introduction of chlorine gas is started already whilst introducing the CuPc. When all the CuPc has been introduced, a vigorous stream of chlorine is passed into the mixture, whilst continuing to apply cooling, so that the amount of chlorine required for chlorination to give the polychloro-CuPc, preferably to give a product containing from 48 to 50 percent by weight of chlorine, is introduced in from 8 to 15 hours, preferably from 10 to 13 hours. The temperature for this stage of the process is preferably from 120 to 140° C. After the exothermic effect had subsided, the chlorination is completed whilst heating at from 140° to 160° C.

In order to finish the product, the reaction mixture obtained is then heated at from 160° to 180° C. the melt is decomposed by introducing it into water by the conventional method, and the polychloro-CuPc which has precipitated is separated off.

The aluminum chloride/sodium chloride melt used as the reaction medium advantageously contains from 20 to 25 parts by weight of sodium chloride per 100 parts by weight of aluminum chloride. In melts of this composition, the solidification point is from 85° to 105° C. The ratio of melt to CuPc before, or at the start of, the chlorination may be up to 1:0.33. As a rule, the ratio, by weight, is from 1:0.20 to 1:0.33 and preferably from 1:0.25 to 1:30. Is is also possible to use melts with a lower content of CuPc, e.g. with a ratio of 1:0.1 or less, but this reduces the space-time yield of the process and the high aluminum content of the melt favors the occurrence of Cu-Al exchange. Furthermore, the amount of mother liquor, containing aluminum chloride, which is produced is substantially greater.

In industrial operation, for about 2,200 kg of melt, the amount of CuPc is from 500 to 720 kg, preferably from 560 to 660 kg. The CuPc should be introduced as rapidly as possible, preferably in an hour or less, into the melt which has been cooled to a temperature from the solidification point to 120° C, preferably to from 90° to 110° C, whilst continuing to apply cooling. Advantageously, chlorine is passed into the melt from the start of the introduction of the CuPc. The amount of chlorine at this stage is from about 35 to 80% of the amount passed in after the CuPc has been introduced. To carry out the chlorination, chlorine is passed in, after having introduced the CuPc, and whilst continuing to apply cooling, at a rate such that per hour from 7 to 12, preferably from 8 to 10, percent by weight of the total amount of chlorine required are passed into the melt. The temperature at this stage is from 120° to 160° C, as a rule from 120° to 140° C from the start to the half-way point of the chlorination and from 140° to 160° C towards the end. Because of the strong exothermic effect, the introduction of chlorine is advantageously regulated as a function of the temperature, so that an optimum amount of chlorine is at all times introduced into the reaction mixture; if the temperature drops, the amount is increased whilst if the temperature rises it is reduced. If, toward the end of the reaction, the heat of reaction evolved becomes less, the temperature is kept at from 140° to 160° C by heating. Under these conditions, the chlorination is as a rule complete after from 10 to 13 hours, i.e. using the process according to the invention from 500 to 720 kg of CuPc, in about 2,200 kg of melt, can be converted in from 10 to 13 hours to give polychloro-CuPc containing from 48 to 50 percent by weight of chlorine.

The process of the invention differs from the processes of the prior art in respect of the following measures:

a. The melt is cooled to temperatures from just above the solidification point to 120° C, preferably to from 90° to 110° C.

b. The CuPc is introduced as rapidly as possible at this temperature, preferably whilst simultaneously introducing chlorine.

c. During the introduction, the cooling of the melt is continued.

d. The ratio of melt to CuPc is advantageously from 1:0.25 to 1:0.30.

e. To carry out the chlorination, the chlorine is passed in immediately after the introduction of the CuPc, at a uniform rate in the course of from 10 to 13 hours, whilst continuing to apply cooling.

Because of the reduction in the reactivity it would have been expected that the chlorination would not start at the lower temperature of from about 90° to 120° C. For this reason, the chlorination reactions disclosed in German Pat. Nos. 1,059,595, 1,254,787 and 1,250,032 were carried out with more active chlorinating agents than chlorine.

It was surprising that the amount of CuPc could be introduced in such a short time, since the volume of the CuPc powder is substantially greater than the available space, and it was also surprising that the resulting mixture remained stirrable. The rapid introduction of increased amounts of CuPc virtually prevents the replacement of copper in the CuPc by aluminum. To prevent this exchange, it has been proposed, e.g. according to the BIOS report (loc. cit.), to introduce the CuPc cautiously, i.e. slowly, into the melt (e.g. according to the BIOS report, at the rate of 220 kg of CuPc over from 1.5 to 2 hours). It was therefore not to be expected that particularly on introducing even larger amounts of CuPc more rapidly, the replacement of copper by aluminum would be virtually prevented.

The heat of solution liberated on introducing the CuPc into the melt is removed by cooling, which makes a rapid introduction at the said temperatures possible. Since the dissolved CuPc further lowers the solidification point of the melt, it is possible to remove the heat of solution without the danger of spontaneous solidification of the melt.

According to the process of the invention, the CuPc in the form of a solution or suspension of from 20 to 26 percent strength by weight in the melt is converted to polychloro-CuPc. Against this, in the processes of the prior art the chlorination is carried out in aluminum chloride/sodium chloride melts containing significantly lower amounts of CuPc.

It was not foreseeable to an expert that it would be possible to increase the concentration of CuPc in the melt so greatly. Since the amount of CuPc at the end of the chlorination has virtually become doubled through the introduction of chlorine into the molecule, it would have been expected that because of the large amount of product the viscosity of the reaction mixture would rise greatly, and that for this reason the reaction mixture could no longer be run out of the reaction kettle, through a pipeline, into the decomposition vessel. Surprisingly, this did not prove to be the case.

The chlorination can be started already during the introduction of CuPc, by passing in a throttled stream of chlorine gas, amounting to from 35 to 80% of the amount passed in after the introduction of CuPc.

After the CuPc has been introduced, the amount of chlorine is immediately increased, preferably to a level at which from 8 to 10% of the stoichiometrically required amount are passed in per hour. At the same time, cooling of the reaction mixture is continued until the evolution of heat subsides. For example, the amount of chlorine required for 600 kg of CuPc is passed in over from 10 to 13 hours, this rate being equivalent to from 100 to 120 kg of chlorine per hour. Compared to the BIOS method (loc. cit.), the amount of chlorine passed in per unit time and per identical amounts of CuPc is three times as great in the process according to the invention.

With such an increase in the amount of chlorine per unit time, it would have been expected that the chlorine would only be absorbed partially by the reaction mixture and that therefore a substantial proportion would escape unutilized. This was also to be expected since - due to the increased CuPc content of the melt - the amount of aluminum chloride, required as the catalyst, is relatively less in the process according to the invention. By cooling the reaction mixture it proves possible to carry out the perchlorination of CuPc with a high space-time yield even at below 150° C. However, in order to carry out a finishing treatment, the melt must be heated, after completion of the reaction, at from 160° to 180° C, preferably at 180° C, since otherwise the product which is isolated cannot be converted to a stable pigmentary form.

Using the process according to the invention, CuPc obtained by any conventional process of manufacture - even CuPc of low purity - can be converted, with high space-time yields, into high quality yellowish green polychloro-CuPc. Furthermore, the products can be converted to high quality pigmentary forms by any conventional finishing processes for polychloro-CuPc.

The Examples which follow further illustrate the process of the invention.

EXAMPLE 1

1,800 kg of aluminum chloride and 420 kg of sodium chloride, as a mixture or in several superposes layers, are heated in a 2.4 m³ apparatus equipped with a stirrer and chlorine inlet tube, and are fused homogeneously in about 5 hours, during which an internal temperature of 160° C is reached. The internal temperature is then lowered, by external cooling whilst stirring, to from 100° to 110° C in the course of one to two hours. 600 kg of copper phthalocyanine (manufactured from phthalodinitrile in nitrobenzene, in accordance with the Example of German Published Application 1,569,646) are introduced at a uniform rate in the course of one hour, whilst continuing to apply cooling. Simultaneously with the introduction of the copper phthalocyanine, the introduction of chlorine gas is started, initially at 30 kg per hour; after 30 minutes, this is increased to 50 kg of $Cl_2$/hour whilst continuing to apply cooling, and after the CuPc has been introduced, the stream of chlorine gas is increased to an average of 100 kg of $Cl_2$/hour. The temperature is kept above 120° and below 150° C in the course of the further chlorination, by simultaneously applying cooling and regulating the stream of chlorine gas to from 80 to 120 kg of $Cl_2$/hour. If the heat of reaction evolved becomes less the temperature is kept at from 140° to 160° C by heating. As soon as the desired degree of chlorination is reached, which is the case after from about 10 to 13 hours, the stream of chlorine gas is shut off and the melt, which is at from 140° to 160° C, is heated to 180° C, kept at this temperature for 30 minutes and then run out through a bottom valve, in the conventional manner, into water; the polychloro-copper phthalocyanine is isolated from the aqueous suspension.

The yield is 1,100 kg of polychloro-copper phthalocyanine, containing from 48 to 49% of chlorine. The aluminum content of a sample which has been dried and recrystallized from concentrated sulfuric acid is less than 0.05%.

EXAMPLE 2

1,800 kg of anhydrous aluminum chloride, 410 kg of sodium chloride and 20 kg of sodium bromide are fused as in Example 1. The introduction of the copper phthalocyanine, and the chlorination, are carried out as in Example 1. The end of the chlorination can be discerned from the occurrence of intense brown bromine vapors.

EXAMPLE 3

1,800 kg of aluminum chloride and 420 of sodium chloride, as a mixture or in several superposed layers, are heated in a 2.4 m³ apparatus equipped with a stirrer and chlorine inlet tube, and are fused homogeneously in about 5 hours, during which an internal temperature of 160° C is reached. The internal temperature is then lowered, by external cooling whilst stirring, to from 100° to 110° C in the course of one to two hours. 600 kg of copper phthalocyanine containing 0.5% of chlorine (manufactured by the baking process from phthalodinitrile and copper-I chloride in accordance with BIOS Final Report No. 960, page 22) are introduced at a uniform rate in the course of one hour, whilst continuing to apply cooling. Simultaneously with the introduction of the copper phthalocyanine, the introduction of chlorine gas is started, initially at 30 kg per hour; after 30 minutes, this is increased to 50 kg of $Cl_2$/hour whilst continuing to apply cooling, and after the CuPc has been introduced, the stream of chlorine gas is increased to an average of 100 kg of $Cl_2$/hour. The temperature is kept above 120° C and below 150° C in the course of the further chlorination, by simultaneously applying cooling and regulating the stream of chlorine gas to from 80 to 120 kg of $Cl_2$/hour. If the heat of reaction evolved becomes less the temperature is kept at from 140° to 160° C by heating. As soon as the desired degree of chlorination is reached, which is the case after 13 hours, the stream of chlorine gas is shut off and the melt, which is at from 140° to 160° C, is heated to 180° C, kept at this temperature for 30 minutes and then run out through a bottom valve, in the conventional manner, into water; the polychloro-copper phthalocyanine is isolated from the suspension.

The yield is 1,100 kg of polychloro-copper phthalocyanine, containing from 48 to 49% of chlorine. The aluminum content of a sample which has been dried and recrystallized from concentrated sulfuric acid is less than 0.05%.

EXAMPLE 4

192 parts of copper phthalocyanine (manufactured by the solvent process in accordance with the Example of German Published Application 1,569,646) are introduced, in the course of 15 minutes, into a melt of 600 parts of aluminum chloride and 135 parts of sodium chloride at 120° C (ratio of melt : copper phthalocyanine = 1 : 0.26). The mixture is stirred at 120° C without passing in chlorine. A sample is taken after 15, 30 and 60 minutes. The samples are decomposed with water and hydrochloric acid and worked up, and dried, by conventional methods. The dried and pulverized sample is stirred in a 10-fold amount of 96% strength sulfuric acid overnight at room temperature, the mixture is poured into a 10-fold amount (based on sulfuric acid) of water and the product is filtered off hot at 60° C, washed neutral and dried. The aluminum content of the samples, determined by the atom absorption analysis method, is:

Residence time in the melt

| 15 minutes | 0.08% Al | as aluminum phthalocyanine |
|---|---|---|
| 30 minutes | 0.08% Al | |
| 60 minutes | 0.08% Al | |

If instead of the 192 parts of copper phthalocyanine, 10 parts of the same copper phthalocyanine are introduced into the same melt, and in other respects the procedure described above is followed, the copper phthalocyanine which has again been precipitated and purified with sulfuric acid in the same manner contains 0.86% of aluminum in the form of aluminum phthalocyanine.

EXAMPLE 5

250 parts of copper phthalocyanine are introduced into a melt of 1,000 parts of aluminum chloride and 210 parts of sodium chloride at 110° C and stirring of the melt is then continued, at 110° C, for a total of 1 hour from the start of the introduction of the copper phthalocyanine. The product is then perchlorinated by passing in chlorine gas, and worked up, in accordance with the description in Example 1. After purification with sulfuric acid in accordance with the description in Example 4, the product contains 48.3% of chlorine, 5.4% of Cu and 0.04% of Al.

We claim:

1. In a process for the manufacture of polychlorophthalocyanines by chlorinating copper phthalocyanine in an aluminum chloride/sodium chloride melt at from 110° to 190° C, the improvement which comprises rapidly introducing at a rate of not less than about 500 to 720 kg/hour from 0.20 to 0.33 part by weight of copper phthalocyanine, per part by weight of melt, into the melt at temperatures from the solidification point of the melt to 120° C, and after this copper phthalocyanine has been introduced, carrying out the chlorination to give polychloro-copper phthalocyanine at from 120° to 160° C whilst passing in, per hour, from 7 to 12% of the total amount of chlorine gas required.

2. A process as claimed in claim 1, wherein the copper phthalocyanine is introduced into the melt at from 90° to 110° C.

3. A process as claimed in claim 1, wherein chlorine is passed into the melt during the introduction of the copper phthalocyanine.

4. A process as claimed in claim 1, wherein a melt is used which contains from 20 to 25 parts by weight of sodium chloride per 100 parts by weight of aluminum chloride.

5. A process as claimed in claim 1, wherein the melt, before or at the start of the chlorination, contains from 0.20 to 0.33 part by weight of copper phthalocyanine per part by weight of aluminum chloride/sodium chloride melt.

6. A process as claimed in claim 1, wherein the melt, before or at the start of the chlorination, contains from 0.25 to 0.30 part by weight of copper phthalocyanine per part by weight of aluminum chloride/sodium chloride melt.

7. A process as claimed in claim 1, wherein, per hour, from 8 to 10 percent of the total amount of chlorine gas required are passed in.

8. A process as claimed in claim 1, wherein the chlorination is first carried out at from 120° to 140° C and, toward the end, when the heat evolved by the reaction becomes less, is completed at from 140° to 160° C.

9. A process as claimed in claim 1, wherein a polychloro-copper phthalocyanine product is separated which has an aluminum content of less than about 0.05% by weight.

10. A process as claimed in claim 8, wherein a polychloro-copper phthalocyanine product is separated which has an aluminum content of less than about 0.05% by weight.

* * * * *